Patented Apr. 11, 1939

2,153,908

UNITED STATES PATENT OFFICE 2,153,908

PROCESS OF MAKING COPPER SULPHATE

Marius C. Bagby, El Paso, Tex.

No Drawing. Application June 26, 1935,
Serial No. 28,583

3 Claims. (Cl. 23—125)

This invention relates to a process for making copper sulphate from copper in any form, particularly copper wire or copper scrap treated with dilute sulphuric acid and has for its principal object the provision of a method of making the salt which will decrease materially the time of treating each batch.

A further object of the invention is the provision of a simple method of forming copper sulphate in rapid manner so that it can be used directly in the zinc-lead concentrators without the necessity of crystallizing the copper sulphate and then dissolving the crystals as needed and then adding this to the concentration fluid.

In previous processes it is old to treat copper scrap with dilute sulphuric acid and to blow air thru the dilute acid and metal in order to provide the necessary oxygen to oxidize the metal to form the oxide which being soluble in the acid will complete the formation of the copper sulphate. The process now in use requires a very considerable number of hours running from sixteen to twenty-six with an average of about twenty hours. The present invention contemplates the addition of either oxygen or ozone, or a combination of these two, to the solution, and in this manner the speed of reaction is greatly increased so that it is possible to treat a batch in as little as seven or eight hours.

In accordance with my invention a relatively narrow and deep container of proper materials, usually an open tank of wood covered with lead, is charged with a considerable excess of copper wire, copper scrap of any kind, or copper in any form offering considerable surface, and the tank is filled with a dilute solution of sulphuric acid which may vary within some limits but is preferably 20% of commercial sulphuric acid of 66° Baumé and the remainder water. It is highly preferable to warm the dilute acid which may be readily performed by having a steam coil near the bottom of the tank. The steam coils should keep the dilute solution at a temperature roughly between 50° and 60° C.

Instead of bubbling air thru the relatively low and wide tank of the prior art, the air is bubbled as thru a perforated circular pipe lying in the bottom of the deep tank and this air carries an appreciable excess of oxygen which may vary within wide limits, in fact up to 100% oxygen. It is my desire to use ozone either alone with the air or with the oxygen but preferably to use air and oxygen and ozone. While it is not necessary to heat the air and oxygen these may be preheated and thus introduced into the tank at the same temperature as the liquid, that is, approximately at 50° C., or as much hotter as may be desired.

The air with its oxygen and/or ozone is bubbled continuously thru the copper scrap until the acid is substantially neutralized, preferably to a point below ½ of 1%.

In my preferred embodiment of the invention this thus produced copper sulphate solution is added directly to the zinc-lead concentrators in such amounts as to give the proper concentration of sulphate but if desired, the copper sulphate solution can be diluted with water before being added to the concentrator.

It is also contemplated to crystallize the copper sulphate in the usual fashion when taken from the tank or to use it directly without crystallization as an insecticide spray after addition of lime and other ingredients.

While the tank might be closed and be subjected to a very considerably higher temperature than herein set forth, and while a considerable pressure could be used, I do not find it necessary to carry the temperature higher than about as stated nor do I prefer to utilize any pressure whatsoever inasmuch as the cycle is completed in such a short time without the use of any pressure.

What I claim is:

1. The process of producing copper sulphate from copper substantially free from sulphuric acid soluble constituents which consists in acting upon the metal in scrap form in the presence of dilute sulphuric acid while bubbling air thru the acid, said air containing a small amount of ozone whereby the speed of reaction is accelerated.

2. The process of producing copper sulphate from copper substantially free from sulphuric acid soluble constituents which consists in acting upon the metal in scrap form in the presence of hot dilute sulphuric acid while bubbling air thru the acid, said air containing a small amount of ozone whereby the speed of reaction is accelerated.

3. The step in the process of forming a fluid containing copper sulphate which consists in acting upon metallic copper substantially free from sulphuric acid soluble constituents with dilute sulphuric acid in the presence of air and a small amount of ozone and adding the so formed substantially pure copper sulphate solution directly to the fluid, said step avoiding the need for intermediate crystallization of the copper sulphate.

MARIUS C. BAGBY.